(12) United States Patent
Fernandez Alonso et al.

(10) Patent No.: US 8,949,950 B2
(45) Date of Patent: Feb. 3, 2015

(54) SELECTION OF SUCCESSIVE AUTHENTICATION METHODS

(75) Inventors: Susana Fernandez Alonso, Madrid (ES); Mats Näslund, Bromma (SE); John Michael Walker, The Hague (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1122 days.

(21) Appl. No.: 12/809,471

(22) PCT Filed: Dec. 20, 2007

(86) PCT No.: PCT/EP2007/064368
§ 371 (c)(1),
(2), (4) Date: Jun. 24, 2011

(87) PCT Pub. No.: WO2009/080106
PCT Pub. Date: Jul. 2, 2009

(65) Prior Publication Data
US 2011/0296489 A1    Dec. 1, 2011

(51) Int. Cl.
*H04W 12/06*   (2009.01)
*H04W 80/10*   (2009.01)
*H04L 29/06*   (2006.01)

(52) U.S. Cl.
CPC ............ *H04L 63/08* (2013.01); *H04L 65/1006* (2013.01); *H04L 65/1069* (2013.01); *H04W 12/06* (2013.01); *H04W 80/10* (2013.01); *H04L 65/1016* (2013.01)

USPC ............................ 726/5; 726/2; 726/3; 726/4

(58) Field of Classification Search
None
See application file for complete search history.

(56) References Cited

U.S. PATENT DOCUMENTS

| 2007/0165630 A1* | 7/2007 | Rasanen et al. ............... 370/389 |
| 2008/0020789 A1* | 1/2008 | Yan et al. ...................... 455/466 |
| 2008/0072301 A1* | 3/2008 | Chia et al. ........................ 726/8 |

FOREIGN PATENT DOCUMENTS

| EP | 1853032 A | 11/2007 |
| JP | 2007-299259 A | 11/2007 |
| WO | WO 2005020619 A1 * | 3/2005 |

* cited by examiner

*Primary Examiner* — Alexander Lagor (57) ABSTRACT

A method of authenticating a user who is a subscriber of a home network, authenticated in a first network, for accessing a service in a second network. This method includes: authenticating the user in the first network with a first authentication method selected in an authentication server; reserving resources for the service towards a rules enforcement device; requesting control rules for the resources towards a control rules server; submitting towards the control rules server information about the first authentication method; determining at the control rules server whether a further authentication of the user with a further authentication method is required; and instructing from the control rules server towards the authentication server to force the further authentication of the user with the further authentication method.

24 Claims, 8 Drawing Sheets

SELECTION OF SUCCESSIVE AUTHENTICATION METHODS

TECHNICAL FIELD

The present invention generally relates to different authentication methods to be applied amongst fixed and mobile networks of different generations including those applied in an IP Multimedia Subsystem. In particular, the invention relates to a method for dynamically selecting a stronger or more suitable authentication method than one already applied and based on different events occurred and policies in such networks.

BACKGROUND

An IP Multimedia Subsystem (hereinafter IMS) enables an operator of a Public Land Mobile Network (hereinafter PLMN) to offer their subscribers multimedia services based on and built upon Internet applications, services and protocols. These multimedia services may be particularly accessible via IMS applications.

A complete solution for the support of IMS applications, in accordance with $3^{rd}$ Generation Partnership Project (hereinafter 3GPP) IMS-related technical specifications, includes terminals for the subscribers or users of the IMS, one or more IP-Connectivity Access Network (hereinafter IP-CAN), and specific functional elements of the IMS as described in 3GPP TS 23.228: "IP Multimedia Subsystem; Stage 2". An exemplary IP-CAN may be a GPRS core network with a GERAN and/or UTRAN radio access networks. Ongoing 3GPP Release 8 also cover a so-called System Architecture Evolution (hereinafter SAE) network as a new type of IP-CAN, in accordance with 3GPP TS 23.401.

Different services and applications can be offered on top of IMS. The IMS allows deployment of peer-to-peer applications such as Multimedia Telephony, Push-to-Talk over Cellular, real-time video sharing, etc, for which the transport connections are dynamically negotiated by a protocol exchange between two end-points. Such protocol exchange is conventionally carried out by coupled protocols such as the Session Initiation Protocol (hereinafter SIP) and the Session Description Protocol (hereinafter SDP) may be, namely a SIP/SDP protocol exchange.

In order to provide a satisfactory and reliable service experience, operators need to take special care of the quality, effective charging and potential fraud on the use of services and IMS applications. To this end, a Policy and Charging Control (hereinafter PCC) architecture is provided, as disclosed in 3GPP TS 23.203, to help operators on the control of the above issues. Thus, the PCC architecture cooperates with the IMS, as well as with any access network, being a fixed or mobile access network, in order to provide a selective control of IP flows, such as Quality of Service (hereinafter QoS), firewall, multiplexing, etc, as well as a selective handling of the negotiated IP flows.

This PCC architecture generally includes an Application Function (hereinafter AF) offering applications that require policy and charging control of resources in the bearer plane and wherein service characteristics are negotiated through in the signalling plane; a Policy and Charging Enforcement Function (hereinafter PCEF) providing service data flow detection, charging and policing enforcement over the traffic in the bearer plane and wherein the service is actually provided through; and a Policy and Charging Rules Function (hereinafter PCRF) providing control functions and installing rules at the PCEF to ensure that only authorized media flows are allowed and are applied the right QoS through the right bearer.

On the other hand, regarding the authentication methods and establishment of shared keys, also known as "authentication and key agreement" (hereinafter AKA), that the different networks may apply, a variety of distinguishable families co-exist nowadays. In this respect, current authentication and key agreement mechanisms used for $2^{nd}$ and $3^{rd}$ generation networks (generally known and hereinafter abbreviated as 2G and 3G networks respectively), as well as those used for IMS networks, are based on the AKA framework described in 3GPP TS 33.102, whereas a so-called Extensible Authentication Protocol, (hereinafter EAP) specified under the IETF, stipulates the AKA mechanisms for non-3GPP access networks to 3G systems. For instance, UMTS-AKA is the authentication and key agreement mechanism used in 3G networks, EAP-AKA is the authentication and key agreement mechanism used in an IWLAN (also known by the telecommunication community as "Inter-working Wireless Land Access Network", "Industrial Wireless Land Access Network", or "Intelligent Wireless Land Access Network"), and IMS-AKA is the authentication and key agreement mechanism used in the application layer of an IMS network.

As new scenarios come into place, where different business operators are present and networks evolve towards fixed-mobile convergent networks, there are expectations on that security needs may vary depending on the kind of network, user, service and application involved. For the sake of simplicity, user and user equipment may be hereinafter abbreviated as UE.

This is apparent where considering that, due to Evolved Packet Core networks, which are also known as a System Architecture Evolution (hereinafter SAE), users will be enabled to move and roam between different Packet Switching (hereinafter PS) access networks whilst consuming a given service. Thus, the currently developed SAE telecom networks provide means for a UE to seamlessly change between heterogeneous access technologies, such as roaming between 3GPP and non-3GPP accesses. However, said accesses to a large variety of networks, whilst maintaining data connectivity, have not yet considered security implications of allowing networks with a variety of security strength and diverse authentication technologies to be interconnected. In this respect, the authentication methods used in 2G/3G/IMS networks, for example, are decided in a static way and not based on any dynamic information obtainable in real time.

In particular, an EAP authentication method has the possibility to issue a specific authentication request based on an assumed authentication method supported in the UE. This assumption needs to be based on a received EAP identity whereby an authentication server might choose to go for an EAP AKA request, or for another method like, for example, a so-called EAP MD5. However, EAP does not consider user status data such as consumed services, requested Packet Data Network (hereinafter PDN), available QoS, etc. Generally speaking, there is no influence nowadays of dynamic data on the authentication method apply to the user.

There are, however, quite a few reasons whereby a number of dynamic data may affect the security of evolving networks.

For instance, a user may be found to suspiciously access a certain service for quite a long time. This situation may be determined where the operator has set a threshold maximum time value "T-max" per service usage and the user accesses a service during a time "T-usage", so that if T-usage>T-max the operator may suspect that the original UE has being impersonated with, for example, a Man-In-the-Middle (hereinafter MIM) attack, terminal hijacking, etc. Currently, the operator can only re-issue the standardised authentication procedure and cannot determine whether it is the same original user or an impersonating user.

Also for instance, a user may be found to attempt to access suspiciously many IP-CAN sessions. This situation may be determined where an operator decides a maximum number of IP-CAN sessions to be established by the user, namely a maximum number of home-IP addresses assigned, and the user is reaching or attempts to exceed this maximum number. In this situation, the operator might not be able to verify whether the user is performing some type of attack, like eavesdropping, fraudulent sharing of user credentials, or others, so that multiple users access data services via one subscription.

Other situations suspicious of compromising the network security, alone or in combination, might be where a user accesses too many services within a same IP-CAN session, where a user uses a maximum bandwidth allowed to the user as part of his subscription, where a user is trying to initiate more bearers than allowed, or where a user changes very frequently the roaming technological accesses, such as between 3GPP access and a Worldwide Interoperability for Microwave Access (hereinafter Wimax).

At present, the operator has no means, in these circumstances, and can not verify whether these activities by end-users should be considered a security threat or whether these activities can actually be authorized to proceed without risk of security or revenues.

SUMMARY

It is an object of the present invention to mitigate at least some of the above disadvantages and provide for a method, device and servers whereby a user, who is a subscriber of a home network and had previously been authenticated with a first authentication method in a first network which the user accesses through, can further be authenticated with a second authentication method where the user accesses a service in a second network. Generally speaking, a further object of the invention is to increase security before granting access by checking if a new authentication is needed. Moreover, other kinds of security enhancements can also be triggered such as, for example, the PCC architecture may decide that, in order to use a service, the UE needs to switch on ciphering and/or message integrity protection.

In particular, said first and second network may, in fact, be a same and unique network or be different networks and, in both cases, be selected among exemplary 2G, 3G, IMS, IWLAN, or Wimax networks amongst others. More generally speaking, said same or different first and second networks may be access networks or service networks operating in accordance with a 3GPP or a non-3GPP standard.

On the other hand, the home network is preferably a network operating in accordance with a 3GPP standard, being thus independent of the access network where the user access through, or it may also be any kind of network, where the user holds a subscription, and compatible with the above same or different first and second networks as particularly or generally selected above.

Thus, in accordance with a first aspect of the present invention, there is provided a method of authenticating a user accessing a service in a second network, where the user is subscriber of a home network and had previously been authenticated in a first network which the user accesses through.

This method comprises the steps of: authenticating the user in the first network with a first authentication method selected in an authentication server of the home network in accordance with access and subscription information for the user; where the user accesses the service in the second network, reserving resources for the service towards a rules enforcement device in charge of handling resources; requesting control rules for the resources from the rules enforcement device towards a control rules server in charge of installing control rules; submitting towards the control rules server information about the first authentication method applied to the user; determining at the control rules server whether a further authentication of the user with a second authentication method is required; and instructing from the control rules server towards the authentication server to force the further authentication of the user with the second authentication method.

In this method, the further authentication of the user with the second authentication method may be particularly carried out in the first network or in the second network depending on whether said further authentication is wanted to be performed by the network previously authenticating the user or by the network where the user currently accesses the service.

In order to advantageously carry out the step of determining whether a further authentication of the user is required with the second authentication method in the control rules server, this step may include a step of applying authentication policies. In particular, said authentication policies may include elements selected from: authentication mechanism, cryptographic strength, and combinations thereof received from the authentication server, in an embodiment, or from the rules enforcement device, in another embodiment. Also in particular, and compatible with these two embodiments, if any, said authentication policies may include elements selected from: time of a latest authentication, access network, roaming status, requested PDN, and combinations thereof received from the rules enforcement device. Moreover, said authentication policies may particularly include elements selected from: service identifier, available QoS, and combinations thereof deducible at the control rules server. Furthermore, this method may also comprise a step of configuring these authentication policies at the control rules server. Then, said authentication policies may further be updated with, or may be applied in combination with, an element selected from: access information, subscription data, service data, and combinations thereof.

In an embodiment of this method, the step of submitting towards the control rules server information about the first authentication method applied to the user may include a step of receiving such information at the control rules server from the authentication server; whereas in another embodiment, the method may further include a step of submitting from the authentication server towards the rules enforcement device the information about the first authentication method applied to the user. Under this another embodiment, the step of submitting towards the control rules server the information about the first authentication method applied to the user may include a step of receiving such information at the control rules server from the rules enforcement device. Moreover, still in this another embodiment, the step of receiving the information about the first authentication method from the rules enforcement device may be carried out simultaneously with the step of requesting control rules from the rules enforcement device towards the control rules server.

In particular, some of the steps of the above method may advantageously be carried out where the authentication server is a Home Subscriber Server "HSS" holding a subscription for the user. Also in particular, and where a PCC architecture is provided for a selective control of IP flows, some of the steps of the above method may advantageously be carried out where the rules enforcement device is a PCEF providing service data flow detection, as well as where the control rules server is a PCRF providing control functions and installing corresponding control rules.

In accordance with a second aspect of the present invention, there is provided a control rules server in charge of providing control functions and installing control rules, and comprising: a receiver for receiving a request for control rules for handling a resource; a control unit for determining the control rules to be installed for handling the resource; and a sender for installing said control rules towards a rules enforcement device.

In order to accomplish some of the steps of the above method, this control rules server is implemented so that the receiver is arranged for receiving information about the first authentication method applied to the user; the control unit is arranged for determining whether a further authentication of the user with a second authentication method is required; and the sender is arranged for instructing an authentication server, which is in charge of selecting an authentication method for authenticating the user, to force the further authentication of the user with the second authentication method.

Correspondingly advantageous as for the above method, the control unit of this control rules server may be arranged for applying authentication policies to determine whether the further authentication of the user with the second authentication method is required. For this purpose, the receiver of this control rules server may be arranged for receiving elements selected from: authentication mechanism, cryptographic strength, and combinations thereof from the authentication server, in an embodiment of the invention, or from the rules enforcement device, in another embodiment of the invention; and the control unit of this control rules server may be arranged for applying the authentication policies including said elements in both embodiments. Also aligned with advantageous steps of the above method, the receiver of this control rules server may be arranged for receiving elements selected from: time of a latest authentication, access network, roaming status, requested PDN, and combinations thereof from the rules enforcement device, and the control unit of this control rules server may be arranged for applying authentication policies including said elements. Moreover, the control unit of this control rules server may be arranged for applying authentication policies including elements selected from: service identifier, available QoS, and combinations thereof deducible therein. Furthermore, this control rules server may further comprise configuration means for configuring the authentication policies to further be updated with, or be applied in combination with, an element selected from: access information, subscription data, service data, and combinations thereof.

Accordingly with alternative embodiments of the above method, the receiver of this control rules server may be arranged for receiving information about the first authentication method applied to the user from the authentication server, in an embodiment, or from the rules enforcement device, in another embodiment. Where the latter embodiment applies, the receiver of this control rules server may further be arranged for receiving the information about the first authentication method applied to the user along with the request for control rules to handle the resource from the rules enforcement device.

Where a PCC architecture is particularly provided for a selective control of IP flows or other functions, this control rules server may be the PCRF.

In accordance with a third aspect of the present invention, there is provided a rules enforcement device in charge of enforcing control rules for resources to provide a service for a user, and comprising: a sender for submitting a request for control rules for handling a resource; a receiver for receiving control rules to be installed for the resource; and a control unit for applying the control rules to the resource.

In order to accomplish some of the steps of the above method, this rules enforcement device is implemented so that the receiver is arranged for receiving information about an authentication method selected for authenticating a user, this information having been submitted from an authentication server of a home network where the user holds a subscription.

In this rules enforcement device, the information about the authentication method received in the receiver may include elements selected from: authentication mechanism, cryptographic strength, and combinations thereof; and the sender of this rules enforcement device may be arranged for submitting said information towards a control rules server in charge of providing control functions and installing control rules.

In particular, and accordingly with the above method and control rules server, the control unit of this rules enforcement device may be arranged for enclosing, along with the information about the first authentication method, access information and service data; and the sender of this rules enforcement device may further be arranged for submitting said information and data towards the control rules server. In this respect, the access information and service data submitted by the sender may include elements selected from: time of a latest authentication, access network, roaming status, requested PDN, and combinations thereof.

As above commented for the control rules server, where a PCC architecture is particularly provided for a selective control of IP flows or other functions, this rules enforcement device may be the PCEF. Moreover, this rules enforcement device may be incorporated in a Gateway GPRS Support Node "GGSN", or in a Packet Data Network Gateway "PDN-GW", or in another corresponding network node depending on the access network where the user accesses through.

In accordance with a fourth aspect of the present invention, there is provided an authentication server for selecting an authentication method for authenticating a user of a home network in a network where the user accesses through and for providing authentication data thereto. This authentication server generally comprises: a receiver for receiving a request for authentication of a user; a control unit for selecting a first authentication method to be applied for the user; and a sender for submitting authentication data in accordance with the selected authentication method for the user.

In order to accomplish some of the steps of the above method, this authentication server is implemented so that the sender is arranged for submitting information about the first authentication method applied to the user; and the receiver is arranged for receiving from a control rules server, which is in charge of providing control functions and installing control rules, an instruction to force a further authentication of the user with a second authentication method.

Moreover, the sender of this authentication server may further be arranged for triggering the further authentication of the user by submitting authentication data in accordance with the selected second authentication method for the user.

In particular, the sender of this authentication server may be arranged for submitting the information about the first authentication method applied to the user towards a rules enforcement device for enforcing control rules for resources to provide a service, in accordance with an embodiment of the invention, or towards the control rules server, in accordance with another embodiment of the invention. More specifically, the information about the first authentication method submitted by the sender of this authentication server may include, for any of these embodiments, elements selected from: authentication mechanism, cryptographic strength, and combinations thereof.

Aligned with corresponding advantageous features of the above method, this authentication server may be a HSS holding subscription data for subscribers of the home network.

The invention may be practiced by one or more computer programs, loadable into an internal memory of a number of computers, each one with input and output units as well as with a processing unit, the computer program comprising executable code adapted to carry out method steps according to the above method when running in the computer. The executable code of the one or more computer programs may be recorded in a carrier readable in a computer.

BRIEF DESCRIPTION OF THE DRAWINGS

The features, objects and advantages of the invention will become apparent by reading this description in conjunction with the accompanying drawings, in which:

FIG. 2 illustrates an exemplary embodiment of a sequence of actions to be carried out where a user is firstly authenticated in a GPRS access network, which the user accesses through.

DETAILED DESCRIPTION

The following describes some preferred embodiments for a method of authenticating a user accessing a service in a second network, where the user is a subscriber of a home network and had previously been authenticated in a first network which the user had accessed through, as well as a device and servers for carrying out this method.

Figure 1A:
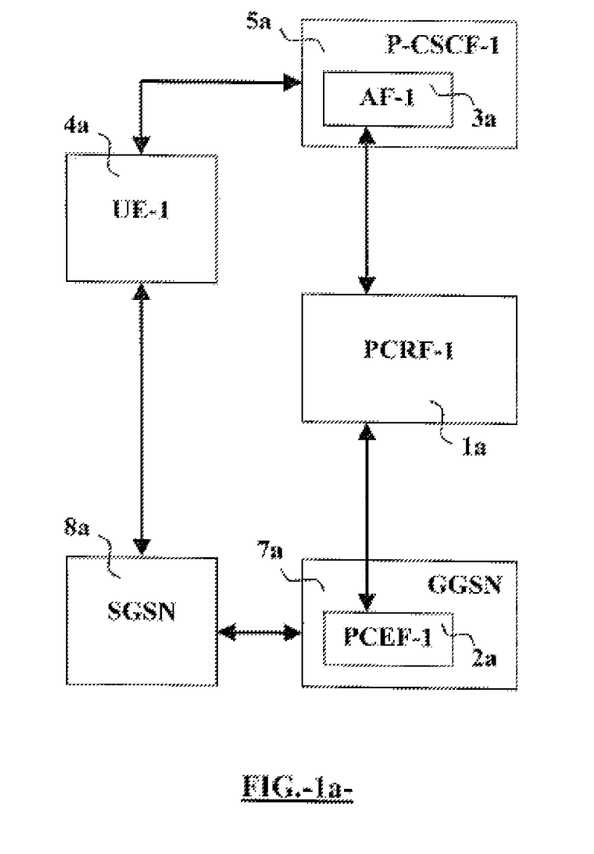
FIG. 1a represents an exemplary scenario of a PCC architecture usable where a user accesses the IMS through a GPRS access network.
Figure 1B:
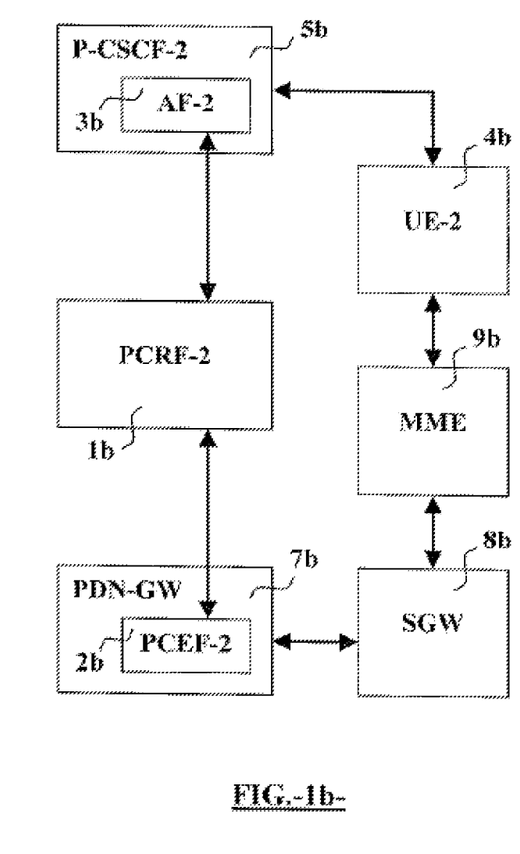
FIG. 1b represents another exemplary scenario of a PCC architecture usable where a user accesses the IMS through a SAE access network.

FIG. 1a and FIG. 1b respectively illustrate exemplary scenarios of a PCC architecture usable where a user accesses the IMS through a GPRS access network, or through a SAE access network. Throughout the present specification, a number of embodiments are exemplary described in accordance with the scenario in FIG. 1a and with reference signs thereto. These embodiments may also be equivalently applied to the scenario in Fig. b, with reference signs thereto, as well as to other scenarios having functional equivalent network nodes.

For example, whatever further reference is made to a first user equipment 4a (hereinafter UE-1) under a given embodiment applied in the scenario of FIG. 1a, such reference may also be made to a second user equipment 4b (hereinafter UE-2) under an equivalent embodiment applied in the scenario of FIG. 1b, unless otherwise specified. Likewise, whatever further reference is made to a first Proxy Call Session Control Function 5a (hereinafter P-CSCF-1) under a given embodiment applied in the scenario of FIG. 1a, the same reference may also be made to a second Proxy Call Session Control Function 5b (hereinafter P-CSCF-2) under an equivalent embodiment applied in the scenario of FIG. 1b, unless otherwise specified.

On the other hand, the control rules server in charge of providing control functions and installing control rules, in accordance with the above second aspect of the present invention, may be exemplary implemented as a PCRF of a PCC architecture. In this respect, whatever further reference is made to a first PCRF 1a (hereinafter PCRF-1) under a given embodiment applied in the scenario of FIG. 1a, such reference may also be made to a second PCRF 1b (hereinafter PCRF-2) under an equivalent embodiment applied in the scenario of FIG. 1b, unless otherwise specified.

Figure 6:
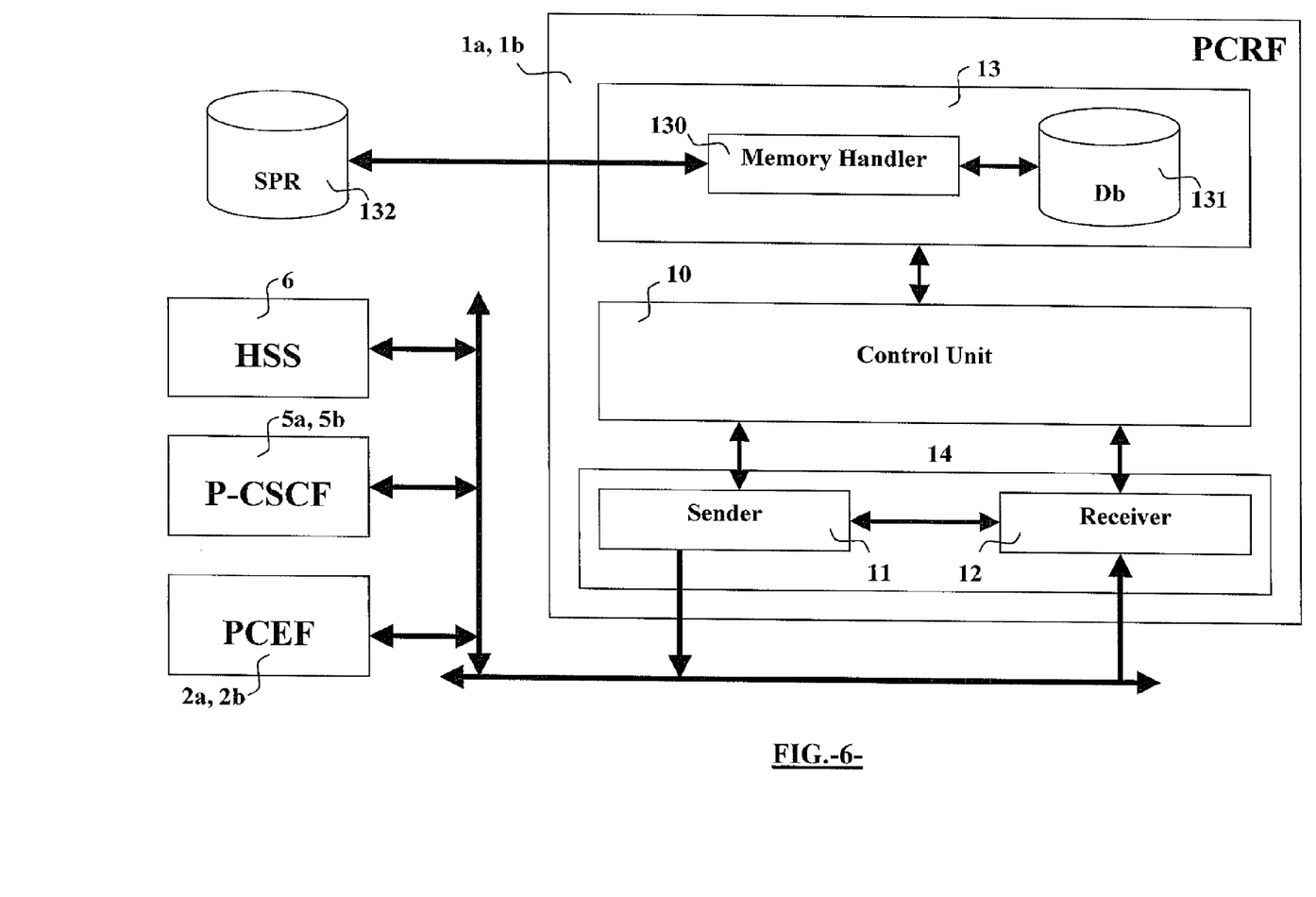
FIG. 6 illustrates structural elements included in a PCRF server acting as a control rules server, in accordance with an embodiment of the invention, as well as connections towards other architectural nodes.

This control rules server, as the exemplary PCRF-1 1a and PCRF-2 1b, comprises: a receiver 12 for receiving a request for control rules for handling a resource; a control unit 10 for determining the control rules to be installed for handling the resource; and a sender 11 for installing said control rules towards a rules enforcement device.

Likewise, the rules enforcement device in charge of enforcing control rules for resources to provide a service for a user, in accordance with the above third aspect of the present invention, may be exemplary implemented as a PCEF of a PCC architecture. Also in this respect, whatever further reference is made to a first PCEF 2a (hereinafter PCEF-1) under a given embodiment applied in the scenario of FIG. 1a, the same reference may also be made to a second PCEF 2b (hereinafter PCEF-2) under an equivalent embodiment applied in the scenario of FIG. 1b, unless otherwise specified.

Figure 7:
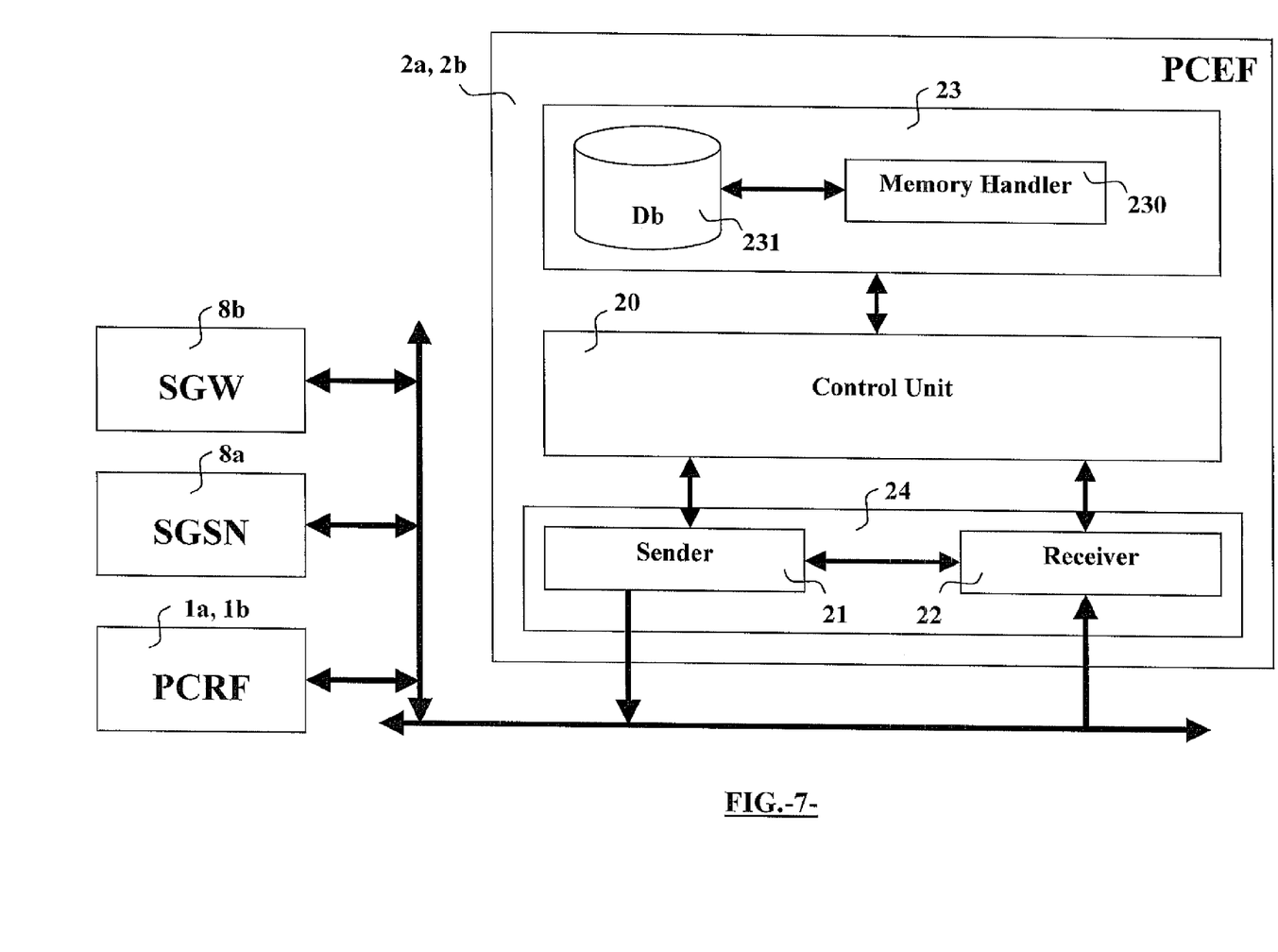
FIG. 7 illustrates structural elements included in a PCEF device acting as a rules enforcement device, in accordance with an embodiment of the invention, as well as connections towards other architectural nodes.

This rules enforcement device, as the exemplary PCEF-1 2a and PCEF-2 2b, comprises: a sender 21 for submitting a request for control rules for handling a resource; a receiver 22 for receiving control rules to be installed for the resource; and a control unit 20 for applying the control rules to the resource.

Regarding the authentication server in charge of selecting an authentication method for authenticating a user of a home network in a network where the user accesses through, and for providing authentication data thereto, in accordance with the above fourth aspect of the present invention, such authentication server is not shown in FIG. 1a or FIG. 1b and may be exemplary implemented as a HSS holding subscription data for subscribers of the home network. In this respect, whatever further reference is made to a HSS 6 under a given embodiment applied in the scenario of FIG. 1a, such reference may also be made to the same HSS 6 under an equivalent embodiment applied in the scenario of FIG. 1b, unless otherwise specified.

Figure 8:
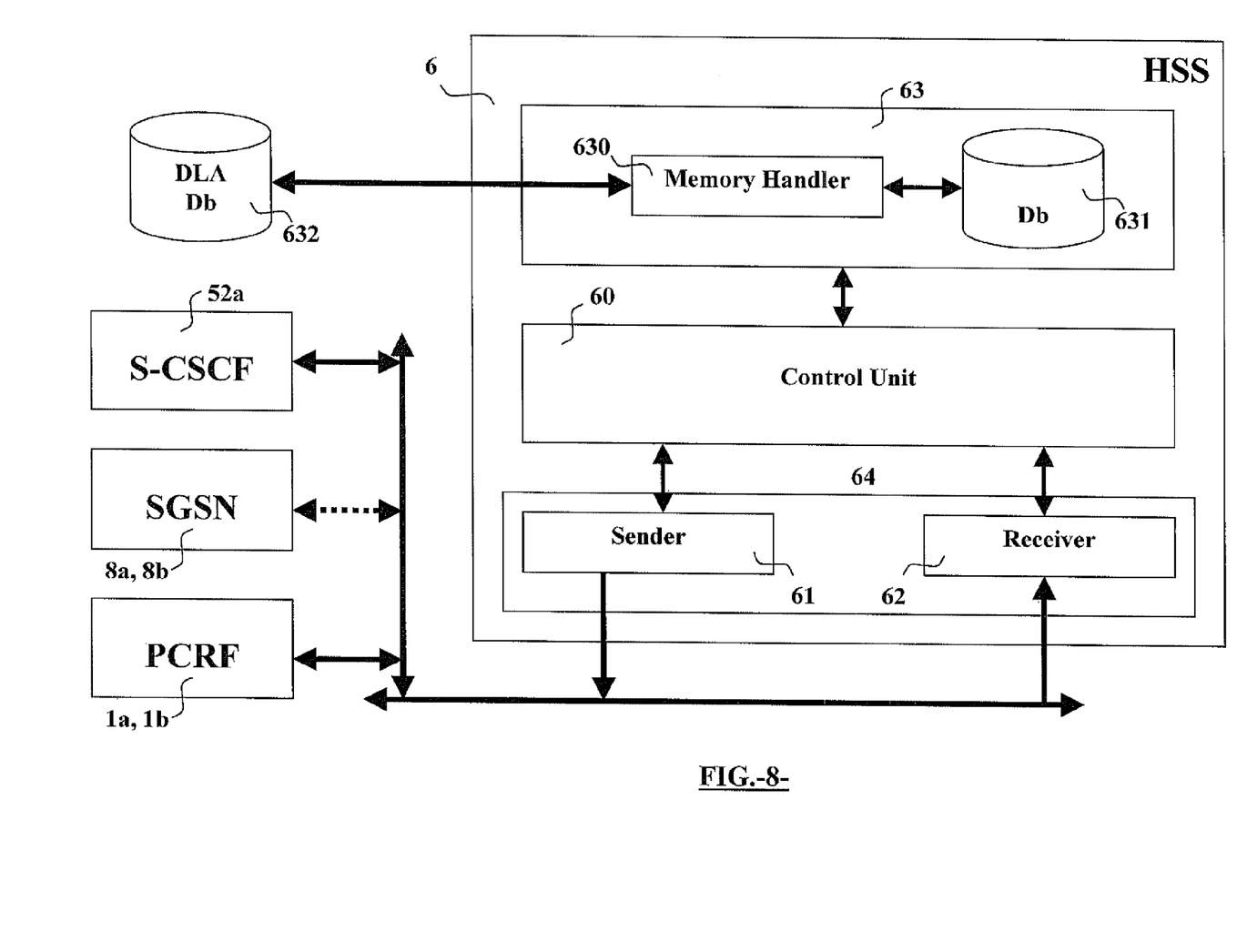
FIG. 8 illustrates structural elements included in a HSS acting as an authentication server, in accordance with an embodiment of the invention, as well as connections towards other architectural nodes.

This authentication server, as the exemplary HSS 6, comprises: a receiver 62 for receiving a request for authentication of a user; a control unit 60 for selecting a first authentication method to be applied for the user, in accordance with access and subscription information for the user; and a sender 61 for submitting authentication data in accordance with the selected authentication method for the user.

Figure 2:
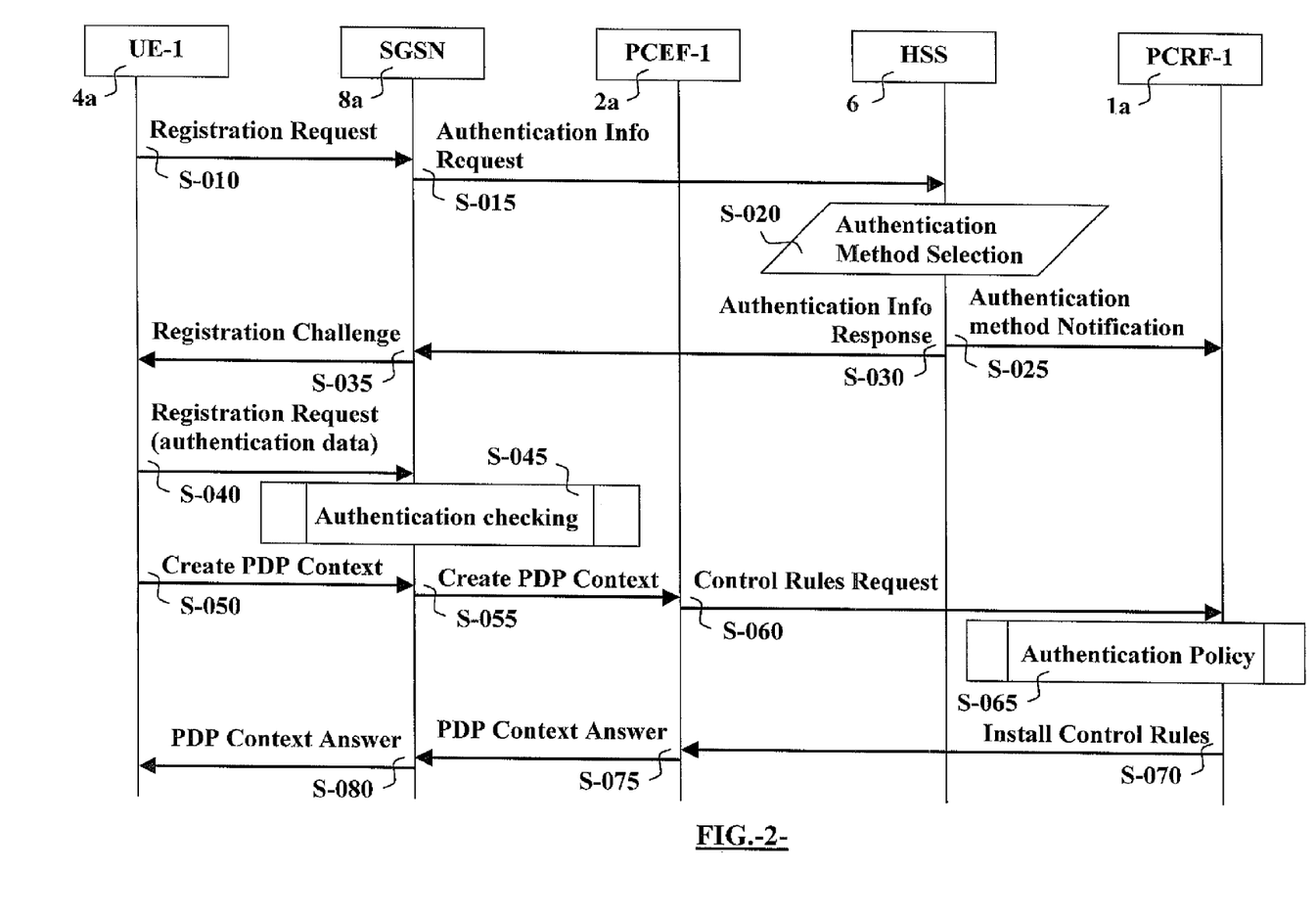

FIG. 2 illustrates an exemplary embodiment where a user, namely UE-1, accesses through a GPRS access network and is firstly authenticated therein. The sequence of actions starts where the UE-1 4a submits during a step S-010 a request for registration towards a Serving GPRS Support Node (hereinafter SGSN) 8a in accordance with conventional GPRS registration procedures. Upon receipt of such request, the SGSN requests during a step S-015 authentication information from a HSS in charge of selecting an authentication method for authenticating each user of the home network. The HSS then selects during a step S-020 an applicable authentication method for the user 4a and returns during a step S-030 a response towards the SGSN 8a including the corresponding authentication information.

Regarding the selected authentication method, the HSS may notify the selected authentication method towards the PCRF-1 1a during a step S-025 carried out before, on or after having returned the authentication information towards the SGSN, in accordance with a first embodiment of the invention as illustrated in this FIG. 2, or towards the PCEF-1 2a, directly or indirectly through other network nodes, in accordance with a second embodiment of the invention not illustrated in any drawing.

To this end, the sender 61 of the HSS 6 is arranged for submitting information about the first authentication method applied to the user, and may be configured for submitting this information towards the PCRF-1 1a, the PCEF-1 2a, or both. Moreover, the sender 61 may be arranged for submitting this information including elements selected from: authentication mechanism, cryptographic strength, and combinations thereof. Aligned with this feature, the receiver 12 of the PCRF-1, the receiver 22 of the PCEF-1, or both may be arranged for receiving information about an authentication method selected for authenticating the user.

This response received at the SGSN 8a may include authentication data required to perform the authentication of the user. In particular, the response may exemplary include an authentication challenge to be submitted towards the UE-1 4a during a step S-035. The UE-1 receiving such challenge processes a corresponding authentication response and returns said authentication response towards the SGSN during a step S-040. The SGSN then carries out an authentication check during a step S-045 to verify whether the authentication response submitted by the UE-1 matches an expected response handled at the SGSN and, in case of matching, the user authentication is found to be successful and thus notified towards relevant entities in accordance with conventional procedures.

Once successfully authenticated, the UE-1 may establish an IP-CAN session during a step S-050 towards the SGSN 8a, which in the case of a GPRS access network corresponds to the creation of a so-called "PDP Context". This establishment of the IP-CAN session is forwarded from the SGSN towards a PCEF-1 2a, which is included under the architectural embodiment of FIG. 1a in a GGSN 7a of the GPRS access network. Irrespective of the above first or second embodiments to notify the selected authentication method, the SGSN may include additional information about the authentication procedure towards the PCEF-1 such as time of a latest authentication, access network, roaming status, requested PDN, and combinations thereof. In addition, where the above second embodiment is followed to notify the selected authentication method from the HSS towards the SGSN, the SGSN may also include information elements selected from: authentication mechanism, cryptographic strength, and combinations thereof, in respect of the authentication procedure carried out to authenticate the UE-1 4a.

To this end, the receiver 22 of the PCEF-1 may be arranged for receiving information elements selected from: time of a latest authentication, access network, roaming status, requested PDN, and combinations thereof; and it may also be arranged for receiving information elements selected from: authentication mechanism, cryptographic strength, and combinations thereof.

Upon receipt of the request to establish the IP-CAN session, the PCEF-1 2a submits during a step S-060 a request for control rules towards a PCRF-1 1a, which is in charge of providing and installing control rules under the architectural embodiment of FIG. 1a. This request for control rules towards the PCRF-1 1a may include, in particular, additional information about the authentication procedure, such as time of a latest authentication, access network, roaming status, requested PDN, and combinations thereof.

To this end, the sender 21 of the PCEF-1 may be arranged for submitting information about the first authentication method, access information and service data towards the PCRF-1 1a, said access information and service data including elements selected from: time of a latest authentication, access network, roaming status, requested PDN, and combinations thereof; and the receiver 12 of the PCRF-1 may be arranged for receiving said elements selected from: time of a latest authentication, access network, roaming status, requested PDN, and combinations thereof from the PCEF-1 2a.

Also in particular, and where the above second embodiment is followed to notify the selected authentication method from the HSS towards the SGSN, directly or indirectly through other network nodes, the request for control rules from the PCEF-1 2a towards the PCRF-1 1a may include information elements selected from: authentication mechanism, cryptographic strength, and combinations thereof, in respect of the authentication procedure carried out to authenticate the UE-1 4a. However, where the above first embodiment is followed to notify the selected authentication method from the HSS 6 directly to the PCRF-1 1a, these information elements selected from: authentication mechanism, cryptographic strength, and combinations thereof, in respect of the authentication procedure carried out to authenticate the UE-1 4a, are already available at the PCRF-1 1a upon receipt of the request for control rules from the PCEF-1 2a with or without said additional information.

To this end, the sender 21 of the PCEF-1 2a and the sender 61 of the HSS 6 may be arranged for submitting information elements selected from: authentication mechanism, cryptographic strength, and combinations thereof towards the PCRF-1 1a; and the receiver 12 of the PCRF-1 1a may be arranged for receiving said information elements from the HSS 6, from the PCEF-1 2a, or from both.

The PCRF-1 1a may advantageously be configured with authentication policies to determine whether a further authentication of the user with a second authentication method is required at any time, especially, where the user accesses a service or through a second network. These authentication policies may include elements selected from: authentication mechanism, cryptographic strength, and combinations thereof received from the HSS 6 or from the PCEF-1 2a, elements selected from: time of a latest authentication, access network, roaming status, requested PDN, and combinations thereof received from the PCEF-1 2a, and elements selected from: service identifier, available QoS, and combinations thereof deducible at the PCRF-1 1a.

To this end, the control unit 10 of the PCRF-1 1a is arranged for determining whether a further authentication of the user is required with a further authentication method and, in particular, this control unit 10 may be arranged for applying the authentication policies including the above elements for determining whether the further authentication of the user is required with the further authentication method. Moreover, the PCRF-1 1a may further comprise configuration means 13 for configuring the authentication policies to be further updated with, or to be applied in combination with, an element selected from: access information, subscription data, service data, and combinations thereof, as those referred above. In particular, this configuration means 13 may include an internal database 131 arranged for storing the authentication policies, and a memory handler 130 for accessing an external database 132, if provided, where subscription data for the users and likely other configurable data may be obtained.

Thus, upon receipt of the request for control rules at the PCRF-1 1a, or at any time when such elements included in the authentication polices are available, the PCRF-1 may update the authentication policies with appropriate current values and apply them within an authentication policy procedure carried out during a step S-065.

In this exemplary sequence of actions illustrated in FIG. 2, no further authentication of the user 4a is determined as a result of applying the authentication policy during this step S-065. Then, the PCRF-1 1a submits during a step S-070 the control rules to be installed towards the PCEF-1 2a. The PCEF-1, once the received control rules are installed for the IP-CAN session, returns during a step S-075 a successful answer for the establishment of the IP-CAN session towards the SGSN 8a, and the latter forwards such successful answer towards the UE-1 4a during a step S-080.

The user, at a later stage may decide to invoke a particular service through the same access network, which in this exemplary embodiment is a GPRS network as shown in the scenario illustrated in FIG. 1a. This particular service to be invoked may require additional or alternative resources from the access network to be notified and reserved at the PCEF-1 2a. In this case and for the sake of clarity in respect of concepts referred above, the first access network where the user was firstly authenticated is the same as the second access network where the user accesses a service.

Figure 3:
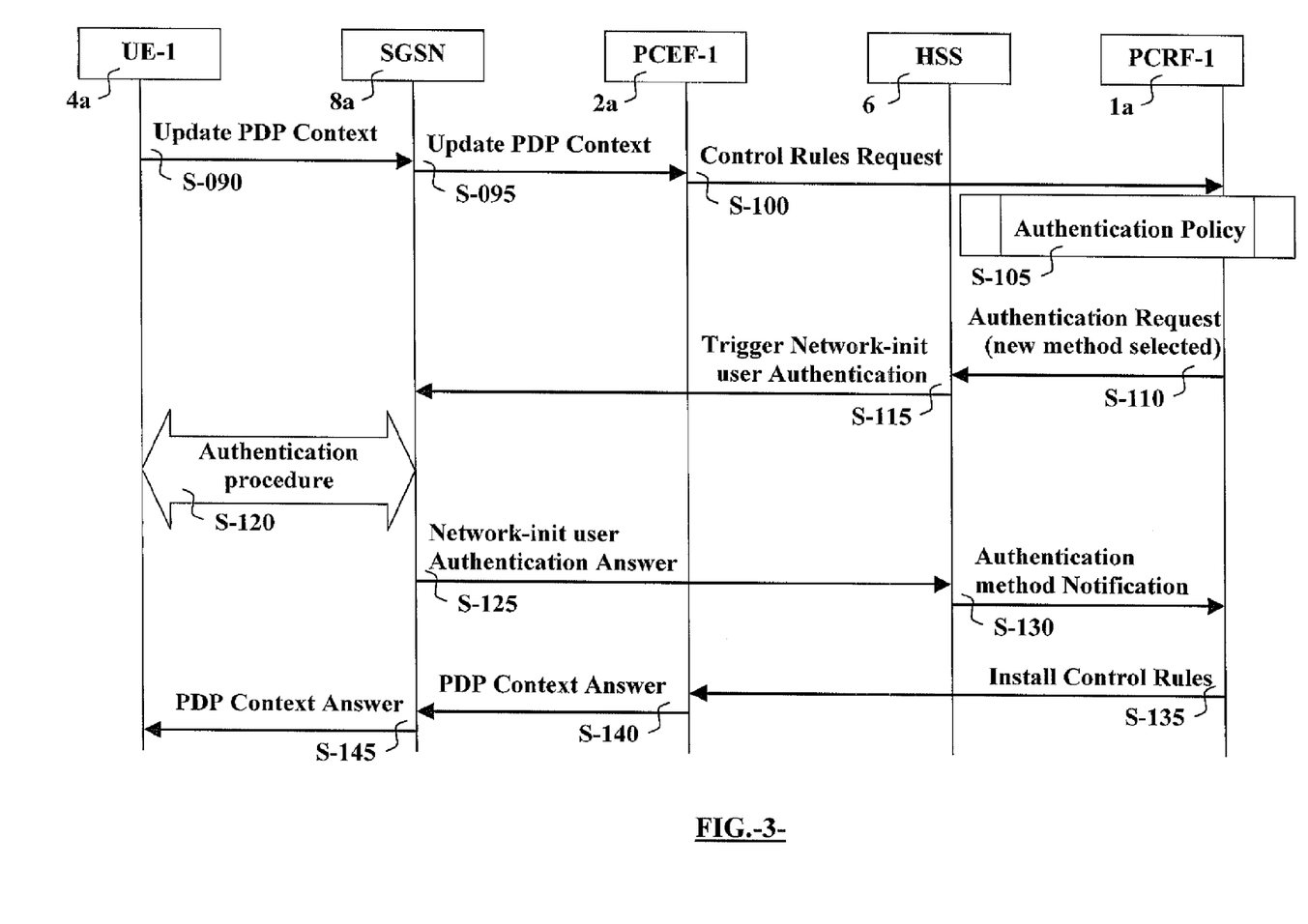
FIG. 3 illustrates an exemplary embodiment of a sequence of actions to be carried out where a user is further authenticated in the GPRS access network, which the user has accessed through as illustrated in FIG. 2, and wherein the user is accessing a service.

To this end, as FIG. 3 illustrates and following a conventional GPRS procedure, the UE-1 submits during a step S-090 an update of the IP-CAN session previously established, namely an update of the so-called "PDP-Context", towards the SGSN 8a serving the user in the GPRS access network.

This update is forwarded during a step S-095 from the SGSN towards the PCEF-1 2a. The PCEF-1 2a, upon receipt of the update, submits during a step S-100 a request for new or updated control rules for the required resources towards the PCRF-1 1a.

In a similar manner as during the establishment of the IP-CAN session, the PCEF-1 may include in this request for new or updated control rules, or may send separately, additional information about the authentication procedure, such as time of a latest authentication, access network, roaming status, requested PDN, and combinations thereof. More specifically, the PCEF-1 may include only those elements not previously submitted or modified accordingly with the particular service invoked.

Then, the PCRF-1 1a may update the authentication policies with appropriate current values and apply them within an authentication policy procedure carried out during a step S-105 as FIG. 3 illustrates. In this particular case, the PCRF-1 may determine as a result of applying the authentication policies that a further authentication of the UE-1 4a is required with a second authentication method, likely with higher cryptographic strength. To this end, the PCRF-1 submits during a step S-110 a request towards the HSS 6 to trigger a further authentication of the UE-1 with the second authentication method determined at the PCRF-1. Alternatively, the PCRF-1 may simply indicate the required cryptographic strength so that the HSS 6, with help of authentication data configured therein, selects an appropriate second authentication method for further authenticating the UE-1 4a with the required cryptographic strength.

To this end, the control unit 10 of the PCRF-1 1a is arranged for determining whether the further authentication of the user with a further authentication method is required; the sender 11 of the PCRF-1 is arranged for instructing the HSS 6 to force the further authentication of the user with the further authentication method; and the receiver 62 of the HSS 6 is arranged for receiving from the PCRF-1 1a an instruction to force the further authentication of the UE-1 4a with the further authentication method.

Then, the HSS triggers during a step S-115 towards the SGSN 8a a further authentication of the UE-1 initiated by the network with the second authentication method selected by the PCRF-1, or by the HSS taking into account a cryptographic strength indication received from the PCRF-1. In particular, the second authentication method may be the same as the first authentication method. Such network-initiated authentication is carried out during a step S-120 between the UE-1 4a and the SGSN 8a, wherein the latter may provide an authentication challenge to the UE-1 4a and may verify a resulting response provided from the UE-1 4a.

To this end, the sender 61 of the HSS 6 may be arranged for triggering a further authentication of the user by submitting authentication data in accordance with a selected further authentication method for the user.

Upon successful authentication of the user, the SGSN 8a submits during a step S-125 a corresponding answer towards the HSS 6 which, in due turn, submits during a step S-130 a notification towards the PCRF-1 1a notifying the authentication method with which the UE-1 has been lastly authenticated.

In this respect, whilst during the previous authentication of the UE-1 with the first authentication method any of the HSS 6 or the PCEF-1 2a could submit this notification following the first and second embodiments explained above for this purpose, the embodiment illustrated for this latest authentication seems to be more efficient to notify the PCRF-1 from the HSS 6 of the selected authentication method, after it has been successfully carried out and without involving the PCEF-1 2a to this end. Nevertheless, an equivalent embodiment may be provided as before whereby the PCEF-1 2a is firstly notified and it then forwards such notification towards the PCRF-1 1a.

The PCRF-1 receiving such notification confirming the latest authentication method carried out for authenticating the UE-1, updates, if necessary the authentication policies, and submits for installation the new or updated control rules during a step S-135 towards the PCEF-1 2a.

The PCEF-1, once the received new or updated control rules are installed for the resources necessary for the service invoked, returns during a step S-140 a successful answer towards the SGSN 8a, and the latter forwards such successful answer towards the UE-1 4a during a step S-145.

One may think in a further scenario where the user, namely UE-1 or UE-2 as commented above, may register into an IMS network for using services therein. In particular, this registration into the IMS network illustrated in FIG. 4 may be carried out once the sequence of actions illustrated in FIG. 3 have been completed, or just after having carried out and completed the sequence of actions illustrated in FIG. 2, and without having updated the IP-CAN session to invoke a service through the original GPRS access network as FIG. 3 illustrates.

Figure 4:
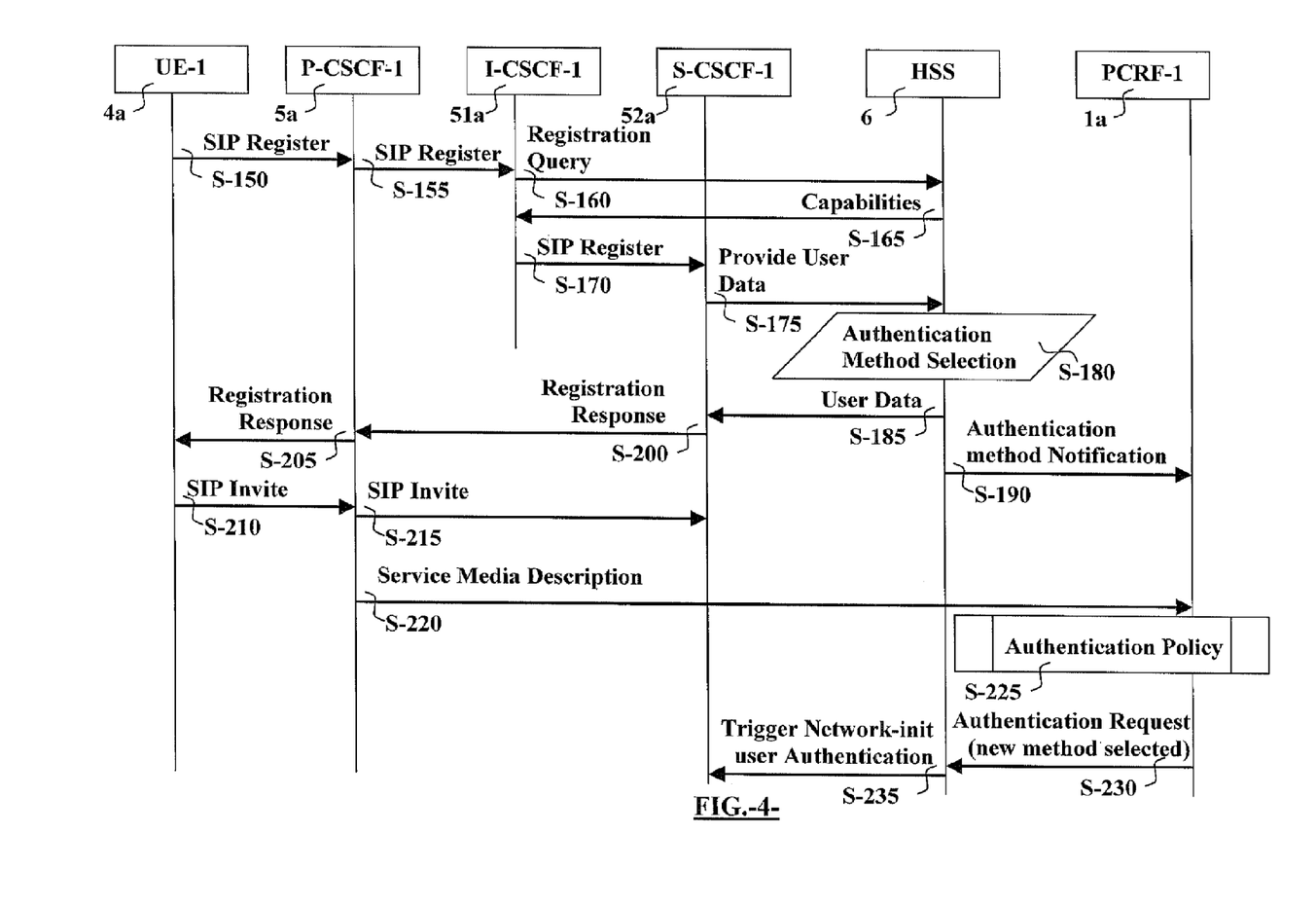
FIG. 4 illustrates an exemplary embodiment of a sequence of actions to be carried out where a user is further authenticated in the IMS network, wherein the user is accessing a service, after having been previously authenticated in another access network, as FIG. 2 exemplary illustrates, in said IMS network as the user registers therein, or in both.

The exemplary embodiment illustrated in FIG. 4 starts where the UE-1 4a submits during a step S-150 a registration towards a P-CSCF-1 5a, which is the entry node into the IMS network. This P-CSCF 5a forwards such registration during a step S-155 towards a first Interrogating Call Session Control Function (hereinafter I-CSCF-1) 51a in charge of assigning a first Serving Call Session Control Function (hereinafter S-CSCF-1) 52a for serving the UE-1 in accordance with conventional IMS procedures. The I-CSCF-1 51a receiving the registration request, submits a registration query during a step S-160 towards the HSS 6, and the latter returns during a step S-165 those capabilities required to a selectable S-CSCF or, alternatively, an identifier of a previously assigned S-CSCF, if that were the case.

The I-CSCF-1 51a thus selects an S-CSCF-1 52a in accordance with the information received from the HSS 6, and submits during a step S-170 the registration request towards this selected S-CSCF-1 52a. The S-CSCF-1 confirms during a step S-175 towards the HSS being assigned for serving the UE-1, what may be considered as an implicit request to provide user data. Upon receipt of such confirmation, the HSS 6 selects an authentication method during a step S-180 to be applied to the user and returns back during a step S-185 a user profile with all relevant data for serving the user and authentication data for authenticating the user in the IMS network.

At this stage different alternatives arise to notify towards the PCRF-1 1a the authentication method selected for a further authentication of the UE-1. On the one hand, the HSS may notify the selected authentication method towards the PCRF-1 1a during a step S-190 carried out before, on or after having returned the authentication information towards the S-CSCF-1 during the step S-185, in accordance with a first embodiment of the invention illustrated in this FIG. 4; or towards the PCEF-1 2a, directly or indirectly through other network nodes, in accordance with a second embodiment of the invention not illustrated in any drawing.

The control unit 10 of the PCRF-1 1a may be arranged for maintaining a history table included in the authentication policies in order to keep track of latest authentication methods carried out by the access network as well by an application network, such as the IMS may be considered to be, for the purpose of the present invention.

In this particular embodiment, the HSS may determine, depending on different reasons, a so-called Single Sign-On (hereinafter SSO) authentication, whereby no further authentication of the user is required. This may occur, for example, where the HSS is aware that the access network where the user was lastly authenticated belongs to the same operator. Thus, upon receipt of a corresponding SSO indication included as authentication data, the S-CSCF 52a submits during a step S-200 a positive registration response towards the P-CSCF 5a, where the UE-1 has accessed through, and the latter forwards such positive registration response during a step S-205 towards the UE-1 4a.

Later, the UE-1 4a may invoke a particular IMS service by submitting during a step S-210 an invitation towards the P-CSCF-15a. The P-CSCF-1 forwards this invitation during a step S-215 towards the S-CSCF-1 52a presently serving the UE-1.

Apart from that, once the P-CSCF-15a is aware of the media required for the service, and which has been negotiated by the UE-1 through the P-CSCF-1, the P-CSCF-1 5a may submit during a step S-220 the description of the media required for the service towards the PCRF-1 1a. The PCRF-1 may, at this stage, update the authentication policies with appropriate current values and apply them within an authentication policy procedure carried out during a step S-225, or may only update them and wait for receiving a request for new control rules corresponding to this media description before applying the updated authentication policies. The PCRF-1, on the other hand, may answer back to the P-CSCF-1, and may carry out other corresponding tasks, according to current procedures and not illustrated in any drawing.

Later on, and not illustrated in this drawing, the request for new control rules corresponding to this media description may be received at the P-CRF-1 as for previous embodiments illustrated in FIG. 2 or FIG. 3, and the updated authentication policies may be applied, if not previously completed within the authentication policy procedure during the above step S-225.

As a result of carrying out the authentication policy procedure, after applying the recently updated authentication policies, the PCRF-1 1a may determine that a further authentication of the UE-1 with a second authentication method is required. To this end, the PCRF-1 submits during a step S-230 a request towards the HSS 6 to trigger a further authentication of the UE-1 with this second authentication method determined at the PCRF-1. Alternatively, as for a previous embodiment explained above, the PCRF-1 may simply indicate the required cryptographic strength so that the HSS 6, with help of authentication data configured therein, selects an appropriate second authentication method for further authenticating the UE-1 4a with the required cryptographic strength.

Then, the HSS 6 triggers during a step S-235 towards the S-CSCF-1 52a the further authentication of the UE-1, initiated by the network, with the second authentication method selected by the PCRF-1 or, as for a previous embodiment explained above, by the HSS taking into account a cryptographic strength indication received from the PCRF-1. Such network-initiated authentication between the S-CSCF-1 52a and the UE-1 4a is carried out following conventional techniques and thus no further described.

One may think in a still further scenario where the user, namely UE-1 or UE-2 as commented above, may access a service through the previous access network but with establishment of a new IP-CAN session, after having been authenticated by the IMS network for using services therein. In particular, this access through the previous access network, but with establishment of a new IP-CAN session, is illustrated in FIG. 5 and may be carried out once the sequence of actions illustrated in FIG. 4 have been completed.

Figure 5:
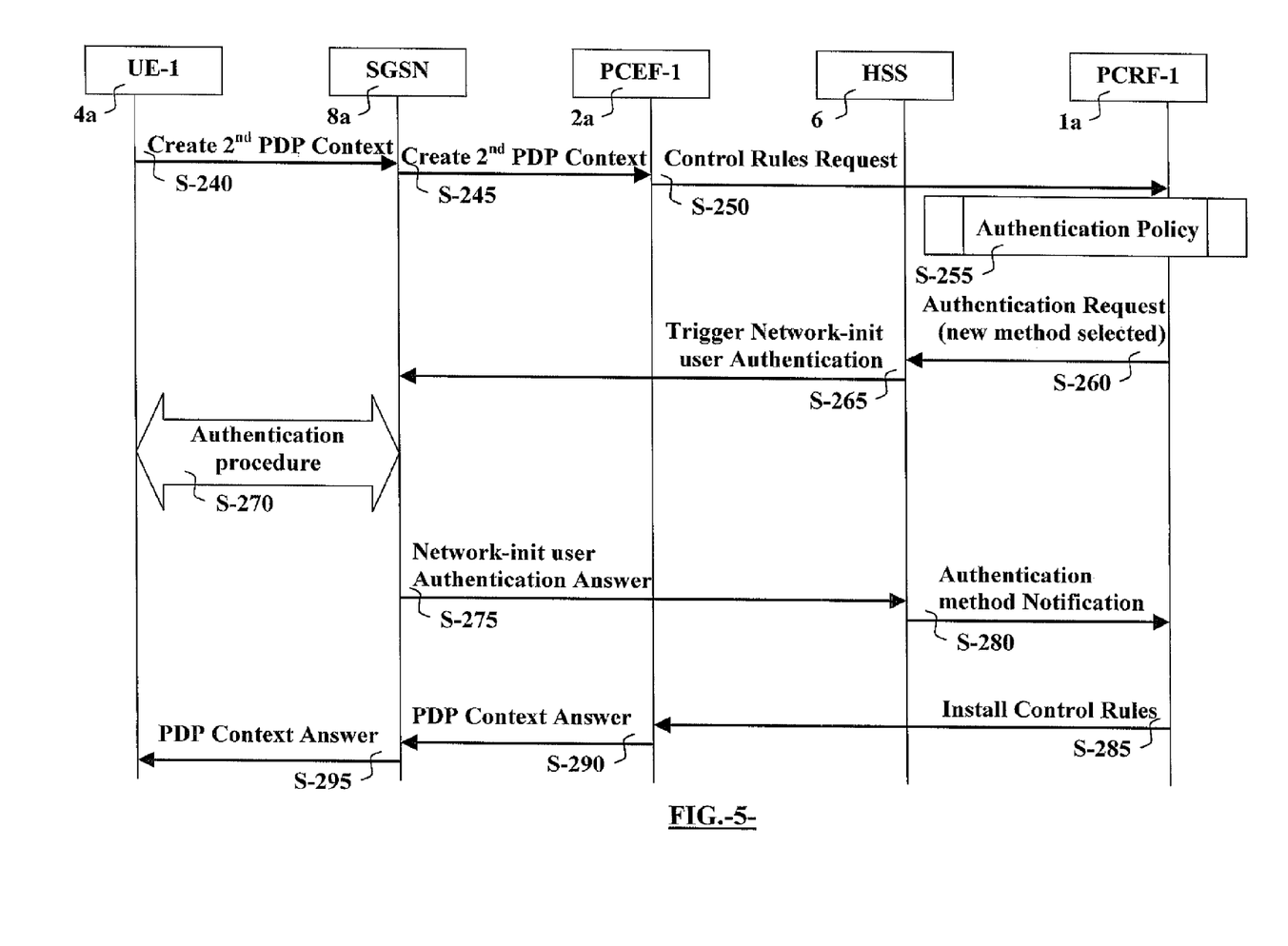
FIG. 5 illustrates an exemplary embodiment of a sequence of actions to be carried out where a user is further authenticated in a GPRS access network, wherein the user is accessing a service, after having been previously authenticated in another access network, as FIG. 2 exemplary illustrates, in an IMS network as exemplary illustrated in FIG. 3, or in both.

Thus the sequence of actions illustrated in FIG. 5 starts where the UE-1 4a establishes a new IP-CAN session during a step S-240 towards the SGSN 8a, which in the case of the previous GPRS access network corresponds to the creation of a so-called second "PDP Context". This establishment of the IP-CAN session is forwarded during a step S-245 from the SGSN towards the PCEF-1 2*a*, which under the architectural embodiment of FIG. 1*a* is included in the GGSN 7*a* of the GPRS access network.

Upon receiving the request for establishment of the second PDP Context, the PCEF-1 2*a* requests during a step S-250 control rules for said second PDP Context towards the PCRF-1 1*a*. Also in this case, as for a previous embodiment, the PCRF-1 may receive before, on or after receiving the control rules, elements selected from: time of a latest authentication, if currently known, access network, roaming status, requested PDN, and combinations thereof from the PCEF-1 2*a*. Then, upon receipt of the request for control rules at the PCRF-1 1*a*, or at any time when such elements included in the authentication polices are available, the PCRF-1 may update the authentication policies with appropriate current values and apply them within an authentication policy procedure carried out during a step S-255.

In this particular case, the PCRF-1 may determine as a result of applying the authentication policies that a further authentication of the UE-1 4*a* is required with a further authentication method, and likely with higher cryptographic strength since the latest authentication was a so-called SSO authentication, which may be assumed to have a lower cryptographic strength. To this end, the PCRF-1 submits during a step S-260 a request towards the HSS 6 to trigger a further authentication of the UE-1 with the further authentication method determined at the PCRF-1.

As for a previous embodiment, the PCRF-1 may alternatively indicate the required cryptographic strength so that the HSS 6, with help of authentication data configured therein, selects the appropriate further authentication method for further authenticating the UE-1 4*a* with the required cryptographic strength.

Then, the HSS triggers during a step S-265 towards the SGSN 8*a* a further authentication of the UE-1 initiated by the network with the authentication method selected by the PCRF-1 or by the HSS. Such network-initiated authentication is carried out during a step S-270 between the UE-1 4*a* and the SGSN 8*a*, wherein the latter may provide an authentication challenge to the UE-1 4*a* and may verify a resulting response provided from the UE-1 4*a*.

Upon successful authentication of the user, the SGSN 8*a* submits during a step S-275 a corresponding answer towards the HSS 6, and the latter may submit during a step S-280 a notification towards the PCRF-1 1*a* notifying the authentication method with which the UE-1 has been lastly authenticated. As already explained above, the HSS 6 or the PCEF-1 2*a* could submit this notification in accordance with embodiments provided for this purpose, though notifying the PCRF-1 from the HSS 6 seems to be more efficient in some embodiments.

The PCRF-1 receiving such notification to confirm the latest authentication method carried out for authenticating the UE-1, updates, if necessary, the authentication policies and submits for installation the new control rules during a step S-285 towards the PCEF-1 2*a*.

In particular, and applicable to this and some previous embodiments, the new control rules may be installed towards the PCEF-1 2*a* at any time after having received the request for control rules during the step S-250. However, if there is a further authentication failure, the rules would have to be de-installed and the service resources released.

The PCEF-1, once the received new control rules are installed for the resources necessary for the service invoked, returns during a step S-290 a successful answer towards the SGSN 8*a*, and the latter forwards such successful answer towards the UE-1 4*a* during a step S-295.

The invention may particularly applied where selecting an authentication method for authenticating a user of a home network operating in accordance with a 3GPP network, whilst the user accesses a service through a network also operating in accordance with 3GPP network, or operating in accordance with a standard other than a 3GPP network. Nevertheless, other combinations are possible in view of the above embodiments.

Regarding implementation of embodiments, the invention can be realized by a computer program, which is loadable into an internal memory of a computer that includes input and output units as well as a processing unit. This computer program comprises executable code portions adapted to carry out sequences of actions described under the above embodiments when running in the computer. In particular, the computer program may be recorded in a carrier computer-readable medium, such as a CD-ROM, DVD, or the like.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A method of authenticating a user accessing a service in a second network, the user being subscriber of a home network and previously authenticated in a first network through which the user accesses the service, the method comprising the steps of:

authenticating the user in the first network, which the user accesses through, with a first authentication method selected in an authentication server of the home network in accordance with access and subscription information for the user;

where the user accesses the service in the second network, requesting reservation of resources for the service to a rules enforcement device, in charge of handling resources;

requesting control rules for the resources from the rules enforcement device to a control rules server in charge of installing control rules;

submitting to the control rules server information about the first authentication method applied to the user;

determining at the control rules server, by applying authentication policies, that a further authentication of the user with a second authentication method is required; and instructing from the control rules server to the authentication server to force the further authentication of the user with the second authentication method, wherein the authentication server is a Home Subscriber Server (HSS) where the user holds a subscription, wherein the rules enforcement device is a Policy and Charging Enforcement Function (PCEF) providing service data flow detection, and wherein the control rules server is a Policy and Charging Rules Function (PCRF) providing control functions and installing corresponding control rules.

2. The method of claim 1, wherein the home network is a network operating in accordance with a $3^{rd}$ Generation Partnership Project (3GPP) network.

3. The method of claim 2, wherein at least one of the first and second networks is an IP Connectivity Access Network (IP-CAN) operating in accordance with a $3^{rd}$ Generation Partnership Project (3GPP) network.

4. The method of claim 1, wherein the further authentication of the user is carried out in the second network.

5. The method of claim 1, wherein the further authentication of the user is carried out in the first network.

6. The method of claim 1, wherein the authentication policies include elements selected from:
   authentication mechanism,
   cryptographic strength, and
   combinations thereof received from the authentication server.

7. The method of claim 1, wherein the authentication policies include elements selected from:
   authentication mechanism,
   cryptographic strength, and
   combinations thereof received from the rules enforcement device.

8. The method of claim 1, wherein the authentication policies include elements selected from:
   time of a latest authentication,
   access network,
   roaming status,
   requested Packet Data Network (PDN), and
   combinations thereof received from the rules enforcement device.

9. The method of claim 1, wherein the authentication policies include elements selected from:
   service identifier,
   available Quality of Service (QoS), and combinations thereof deducible at the control rules server.

10. The method of claim 1, further comprising a step of configuring the authentication policies at the control rules server, said authentication policies to be further updated with, or to be applied in combination with, an element selected from:
    access information,
    subscription data,
    service data, and
    combinations thereof.

11. The method of claim 1, wherein the step of submitting towards the control rules server information about the first authentication method applied to the user includes a step of receiving such information at the control rules server from the authentication server.

12. The method of claim 1, further comprising a step of submitting from the authentication server towards the rules enforcement device information about the first authentication method applied to the user.

13. The method of claim 12, wherein the step of submitting towards the control rules server information about the first authentication method applied to the user includes a step of receiving such information at the control rules server from the rules enforcement device.

14. The method of claim 13, wherein the step of receiving information about the first authentication method applied to the user from the rules enforcement device is carried out simultaneously with the step of requesting control rules from the rules enforcement device towards the control rules server.

15. A control rules server for providing control functions and installing control rules, and the control rules server comprising:
    a receiver for receiving a request for control rules for handling a resource;
    a control unit for determining the control rules to be installed for handling the resource; and
    a sender for installing said control rules to a rules enforcement device;
        the receiver being arranged for receiving information about a first authentication method applied to the user;
        the control unit being arranged for applying authentication policies to determine that a further authentication of the user with a second authentication method is required; and
        the sender being arranged for instructing an authentication server, in charge of selecting an authentication method for authenticating the user, to force the further authentication of the user with the second authentication method,
    wherein the authentication server is a Home Subscriber Server (HSS) where the user holds a subscription,
    wherein the rules enforcement device is a Policy and Charging Enforcement Function (PCEF) providing service data flow detection, and
    wherein the control rules server is a Policy and Charging Rules Function (PCRF) providing control functions and installing corresponding control rules.

16. The control rules server of claim 15, wherein the receiver is arranged for receiving elements selected from:
    authentication mechanism,
    cryptographic strength, and
    combinations thereof from the authentication server, and the control unit being arranged for applying authentication policies including said elements.

17. The control rules server of claim 15, wherein the receiver is arranged for receiving elements selected from:
    authentication mechanism,
    cryptographic strength, and
    combinations thereof from the rules enforcement device, and the control unit being arranged for applying authentication policies including said elements.

18. The control rules server of claim 15, wherein the receiver is arranged for receiving elements selected from:
    time of a latest authentication,
    access network,
    roaming status,
    requested Packet Data Network (PDN), and
    combinations thereof from the rules enforcement device the control unit being arranged for applying authentication policies including said elements.

19. The control rules server of claim 15, wherein the control unit is arranged for applying authentication policies including elements selected from:
    service identifier,
    available Quality of Service (QoS), and
    combinations thereof deducible therein.

20. The control rules server of claim 15, further comprising configuration means for configuring the authentication policies to be further updated with, or to be applied in combination with, an element selected from:
    access information,
    subscription data,
    service data, and
    combinations thereof.

21. The control rules server of claim 15, wherein the receiver is arranged for receiving from the authentication server information about the first authentication method applied to the user.

22. The control rules server of claim 15, wherein the receiver is arranged for receiving from the rules enforcement device the information about the first authentication method applied to the user.

23. The control rules server of claim 22, wherein the receiver is further arranged for receiving the information about the first authentication method applied to the user along with the request for control rules to handle the resource from the rules enforcement device.

24. The control rules server of claim 15, wherein the PCRF operates in accordance with a Policy and Charging Control (PCC) architecture.

* * * * *

UNITED STATES PATENT AND TRADEMARK OFFICE
CERTIFICATE OF CORRECTION

| | | |
|---|---|---|
| PATENT NO. | : 8,949,950 B2 | Page 1 of 1 |
| APPLICATION NO. | : 12/809471 | |
| DATED | : February 3, 2015 | |
| INVENTOR(S) | : Fernandez Alonso et al. | |

It is certified that error appears in the above-identified patent and that said Letters Patent is hereby corrected as shown below:

On the title page item (57), under "ABSTRACT", in Column 2, Line 2, delete "network," and insert -- network --, therefor.

In the Specification,

In Column 14, Line 5, delete "P-CSCF-15a." and insert -- P-CSCF-1 5a. --, therefor.

In Column 14, Line 8, delete "P-CSCF-15a" and insert -- P-CSCF-1 5a --, therefor.

In Column 14, Line 25, delete "P-CRF-1" and insert -- PCRF-1 --, therefor.

Signed and Sealed this
Seventh Day of July, 2015

Michelle K. Lee
*Director of the United States Patent and Trademark Office*